United States Patent [19]

Muller

[11] Patent Number: 4,944,174
[45] Date of Patent: Jul. 31, 1990

[54] PROCESS FOR COOLING HEATED MATERIAL

[75] Inventor: Peter Muller, Neuss, Fed. Rep. of Germany

[73] Assignee: Deutsche Voest-Alpine Industrieanlagenbau GmbH, Duesseldorf, Fed. Rep. of Germany

[21] Appl. No.: 196,941

[22] Filed: Apr. 21, 1988

[30] Foreign Application Priority Data

Apr. 21, 1987 [DE] Fed. Rep. of Germany ....... 3713401

[51] Int. Cl.$^5$ .......................... B21B 45/02; C21D 1/56
[52] U.S. Cl. .......................................... 72/201; 72/202
[58] Field of Search .................. 72/200, 201, 202, 364, 72/700; 148/12 R, 12 B, 12.1, 15, 157

[56] References Cited

U.S. PATENT DOCUMENTS

| | | | |
|---|---|---|---|
| 1,194,829 | 8/1916 | Fay | 148/157 X |
| 1,916,407 | 7/1933 | Bellis | 148/15 |
| 3,669,761 | 6/1972 | Schulze et al. | 148/15 |
| 3,858,859 | 1/1975 | Baguet | 148/15 X |
| 4,793,869 | 12/1988 | Krauss et al. | 148/15 X |

FOREIGN PATENT DOCUMENTS 1242662 6/1967 Fed. Rep. of Germany ........ 148/15

Primary Examiner—E. Michael Combs
Attorney, Agent, or Firm—Barnes & Thornburg

[57] ABSTRACT

A heating bath including molten metal is situated at an entry into a hot roll mill such that the metal stock entering the hot roll mill passes through the heating bath to acquire heat therefrom. A cooling bath including molten metal is situated at an exit from the hot roll mill such that the metal stock exiting from the hot roll mill passes through the cooling bath delivering heat thereto. The molten metal in each of the baths is caused to flow counter to the direction of passing of the metal stock therethrough to form within each bath a hotter fraction and a cooler fraction of the molten metal. The molten metal is circulated between the heating bath and the cooling bath so that a hottest fraction of the molten metal in the cooling bath is transferred to the heating bath and a coolest fraction of the molten metal in the heating bath is transferred to the cooling bath.

15 Claims, 1 Drawing Sheet

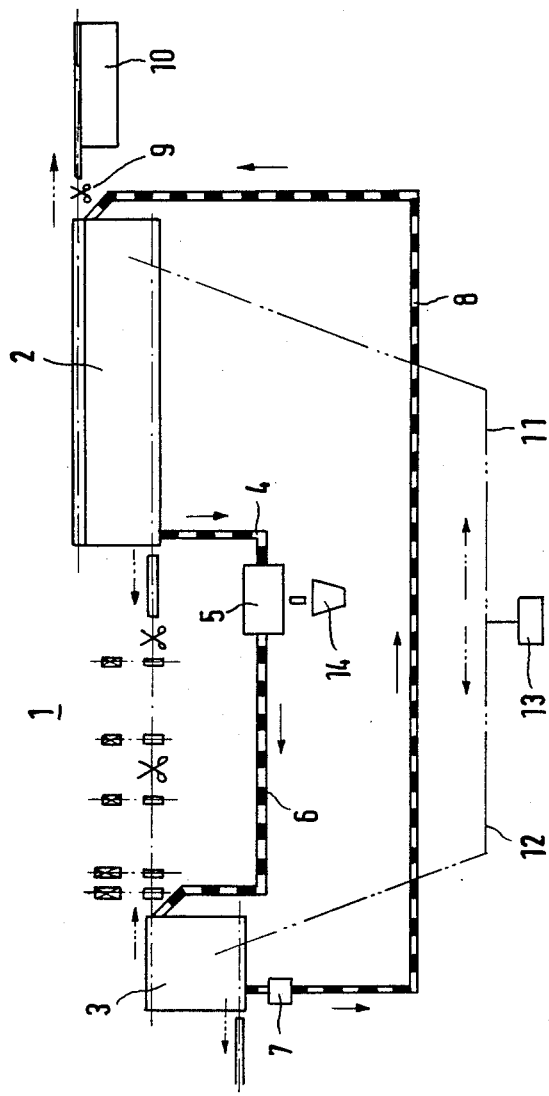

PROCESS FOR COOLING HEATED MATERIAL

The invention concerns a process for cooling heated material by means of a molten coolant and subsequent cooling of the heated coolant utilizing the the heat extracted thereby, the coolant being passed through a circulatory system, as well as a system for implementing this process.

A principal consideration of the present invention is to make maximum possible use of the heat transferred to a coolant during cooling of a heated material. In cooling extremely hot materials, for example at a temperature of about 1000° C. and using a molten coolant, it is desirable to employ a coolant which, by virtue of its efficiency of heat recovery, possesses a low melting point as close as possible to ambient temperature as well as a high boiling point well above that of the material to be cooled, so that the vapour tension at this temperature is as low as possible, in order to minimize coolant losses. The efficiency of heat recovery increases in inverse proportion to the temperature of the material after cooling. It is therefore preferable that the melting point of the liquid coolant should be as low as possible. In addition, the coolant should possess a high degree of chemical stability and, in the event of its coming in direct contact with the material to be cooled, it should be non-wetting, as otherwise there is a risk that, on separation of coolant and cooled material, the latter will pick off part of the coolant, thus involving relatively high losses of the latter and that, in addition undesirable extraneous matter formation will occur on the surface of the material. Finally, it is also important that favorable heat transfer should take place between the coolant and the material to be cooled, whereby the cooling time can be kept relatively short.

It is therefore the purpose of the present invention to specify a process for cooling heated material by means of a molten coolant and for subsequent cooling of the heated coolant utilizing the heat thus extracted, the coolant being passed in a circulatory system, where in particular a high level of efficiency in heat recovery is achieved, which operates with low coolant loss and a high degree of heat transfer is achieved, so that at least the cooling time is relatively short.

This problem is solved by employing a coolant consisting essentially of molten Pb or an alloy thereof, preferably a ternary Pb-Sn-Bi alloy. Advantageous developments of the process according to the invention as well as designs of a suitable system for carrying out this process are hereafter described and claimed.

The ternary alloy of Pb, Sn and Bi has in its eutectic a composition of 33% Pb, 15.5% Sn and 51.5% Bi. The melting temperature of this alloy is 97° C. and the boiling temperature of the individual components are in excess of 1450° C. Thus, the coolant can pass through a temperature range of 120° to 1300° C. between cooling and heating.

The composition of the ternary Pb-Sn-Bi alloy is preferably in the range of the eutectic. On account of the considerable difference in the prices of the individual metals of this alloy, it may however be desirable to deviate from this composition and in particular to choose a higher lead content, as a result of which the melting point will be raised slightly. An alloy of 41% Pb, 21% Sn and 38% Bi has a melting point of 115° C. which is thus only insignificantly higher than that of the eutectic; it is however considerably cheaper than the eutectic alloy. This should be considered against the possible resultant reduction in efficiency of heat recovery.

The metals of the coolant oxidize very rapidly in the presence of oxygen. It is therefore desirable for gases coming in contact with the coolant to be oxygen-free. A suitable gas for this purpose is an inert gas, such as nitrogen. As oxidation of the alloy materials cannot be completely prevented, it is advisable to bring the coolant inside the circuit in contact with a reducing agent. Fine coke is regarded as suitable for this purpose; it floats on the coolant and reduces the metal oxides formed, so that immediate recovery of the alloy metals results.

The invention will be described in detail below with the aid of design examples illustrated in the FIGURE. The FIGURE shows in schematic form a cooling and heat recovery plant for a rolling mill.

In a known rolling plant 1, metal rolling material is rolled to the required form at the appropriate temperature. The temperature of the rolling material leaving rolling plant 1 is for example 900° C. This rolling material passes from rolling plant 1 into a cooling bath 2 in which it is cooled to a required temperature in the range of 130° to 300° C. This temperature is dependent on the composition of the molten Pb-Sn-Bi alloy.

Before entry into rolling plant 1, the rolling material is brought from ambient temperature to the necessary rolling temperature in heating bath 3, Heating is effected by heat exchange with the coolant for the rolled material which has emerged from rolling plant 1 which has been heated by heat exchange with the rolled material in cooling bath 2 and is conveyed by pipe 4, firstly to a reheating furnace 5 and from thence via pipe 6 to the heating bath 3. In the reheating furnace 5 the coolant is brought, to a temperature slightly above the rolling temperature, for example 1200° C. The reheating furnace 5 can be of any design, but an induction furnace (tunnel furnace) is advisable for accurate, simple, rapid control of the temperature of the coolant. This furnace has the additional advantage that the molten coolant will be very vigorously circulated.

The coolant, cooled to a temperature in the range of 130° to 300° C. in heating bath 3, is returned to by pump 7 via pipe 8 to cooling bath 2 in which, as described, the rolled material from rolling plant 1 is recooled. Cooling bath 2 and heating bath 3 form a counterflow heat exchangers.

After passing through a cold shear 9, the cooled rolled material then passes to a transfer device 10. If the rolled material consists of steel bars which have to be straightened, its temperature should be about 150° C., as it is undesirable to straighten steel bars at a temperature in excess of 160° C. Final cooling of the rolled material to ambient temperature will take place preferably in a subsequent water bath.

Cooling bath 2 and heating bath 3 are of identical construction, the requirements imposed on cooling bath 2 being slightly less demanding, as the maximum temperature occurring there will be about 200° to 300° C. lower than that in the heating bath 3. The two baths each consist of a ceramic lined trough, through which the rolling/rolled material is conveyed step-by-step at right angles to its longitudinal axis by a walking beam device. In this connection, it should be noted that the rolling/rolled material floats on the coolant (specific weight of coolant=approx. 8.5 g/cm$^3$) and thus the walking beam device must operate in the opposite fashion to normal mode, i.e. from top to bottom.

The bath space above the coolant surface is completely closed and filled with nitrogen to prevent oxidation of the coolant as far as possible. This also minimizes heat losses. For this purpose, cooling bath 2 is connected via pipe 11 and heating bath 3 via pipe 12 to a nitrogen source 13.

The closed bath space is connected to the surrounding atmosphere by only two passages in each case, that is to say those for infeed and outfeed of the rolling-/rolled material. These passages are designed as small as possible and are fitted if necessary with locks. In addition, the passages are provided with extractors acting vertically, i.e. from top to bottom, which prevent noxious metal vapours escaping from the bath space into the surrounding atmosphere.

Upstream of cooling bath 2 it is possible to interpose a turnover gear (not shown) for the incoming rolling material, so that concave surfaces of a rolled profile are on top or face sideways to prevent formation of air bubbles under a surface of this shape.

Conveyance of the coolant from heating bath 3 to cooling bath 2 can be effected by pump 7, as the coolant temperature is lowest here. Conveyance from cooling bath 2 to heating bath 3 on the other hand is not possible in this fashion as here, on account of the high temperature of the coolant, a conventional pump for molten metals cannot be used. Between cooling bath 2 and reheating furnace 5 and between the latter and heating bath 3 it is necessary to provide a slight gradient of approx. 0.5% so that the coolant is conveyed by gravity. Accordingly, it is also necessary to construct rolling plant 1 on a light incline, i.e. in relation to cooling bath 2 each roll stand must be a few millimeters higher than the preceding one.

It may be desirable to provide a brush or blast cleaning device at the rolling material outfeeds of the two baths in order to remove coolant from the surface of the rolling/rolled material before it leaves the bath area. This will protect the surrounding atmosphere from escape of toxic lead vapours and reduce coolant losses.

Long-term oxidation of the coolant metals, particularly by reduction of the scale-encrusted surface of the rolled material, cannot be prevented. This oxidation can be reversed in the coolant circuit by spreading a layer of fine coke on the coolant in one or both baths; this will reduce any Pb, Sn or Bi oxides and thus result in immediate recovery of these metals.

The use of the ternary Pb-Sn-Bi alloy as coolant also has the advantage that any risk of scaling and decarburizing of the rolling/rolled material is prevented during heating and cooling.

Finally, the plant shown in the illustration also has a preparation ladle 14 for the coolant, in which the latter is liquefied before feeding into the circuit.

The plant can be extended by connecting several rolling plants, continuous casting plants, heat treatment plants and the like by means of a common coolant conveyer system.

Finally it should be pointed out that especially in order to save costs it is favorable to bring instead ternary Pb-Sn-Bi alloy only Pb as coolant to action.

What is claimed is:

1. A process for heating metal stock prior to its introduction into a hot roll mill and subsequent cooling after its egression therefrom comprising the steps of:

situating a heating bath including molten metal at an entry into a hot roll mill such that metal stock entering the hot roll mill passes through the heating bath acquiring heat therefrom;

situating a cooling bath including molten metal at an exit from the hot roll mill such that the metal stock exiting the hot roll mill passes through the cooling bath delivering heat thereto;

flowing the molten metal in each of said baths counter to the direction of passing of the metal stock therethrough to form within each bath a hotter fraction and a cooler fraction of the molten metal; and circulating the molten metal between the heating bath and cooling bath so that the hotter fraction of the molten metal in the cooling bath is transfered to the heating bath and the cooler fraction of the molten metal in the heating bath is transfered to the cooling bath.

2. A process for heating metal stock prior to its introduction into a mechanical working station and subsequent cooling after its egression therefrom comprising the steps of:

situating a heating bath including molten metal at an entry into a mechanical working station such that metal stock entering the mechanical working station passes through the heating bath in a first direction acquiring heat therefrom;

providing a flow of molten metal through the heating bath in a second direction generally opposite the first direction from a hot end to a cool end of the heating bath;

situating a cooling bath including molten metal at an exit from the mechanical working station such that the metal stock exiting the mechanical working station passes through the cooling bath in a third direction delivering heat thereto;

providing a flow of molten metal through the cooling bath in a fourth direction generally opposite the third direction from a cool end to a hot end of the cooling bath; and circulating the molten metal between the heating bath and cooling bath so that molten metal in the hot end of the cooling bath is transfered to the heating bath and molten metal in the cool end of the heating bath is transfered to the cooling bath.

3. Process in accordance with either of claim 1 or 2 wherein the molten metal passes through a temperature range of between about 120° to 1300° C.

4. Process in accordance with either of claims 1 or 2 wherein the molten metal is brought in contact with a reducing agent.

5. Process in accordance with claim 4, characterized by the fact that the reducing agent is coke.

6. The process of claim either of claims 1 or 2 wherein the circulating step comprises the steps of:

pumping the molten metal coolant from the heating bath to the cooling bath, and providing a gravitational gradient for conveying the molten metal coolant from the cooling bath to the heating bath.

7. The process of either of claims 1 or 2 further comprising the step of turning the metal stock prior to its introduction into the cooling bath.

8. The process of either of claims 1 or 2 further comprising the step of cleaning the molten metal coolant from a surface of the metal stock before outfeed of the metal stock from the cooling bath and the heating bath.

9. The process of either of claims 1 or 2 wherein the molten metal consists essentially of Pb.

10. The process of either of claims 37 or 38 wherein the molten metal consists essentially of a ternary Pb-Sn-Bi alloy.

11. Process in accordance with claim 10 wherein the composition of the ternary Pb-Sn-Bi alloy is within the range of its eutectic.

12. The process of either of claims 1 or 2 further comprising the step of inhibiting the oxidation of the molten metal by enclosing each of the baths in an enclosure containing an inert gas.

13. Process in accordance with claim 12 wherein nitrogen is used as the inert gas.

14. The process of claim 12 further comprising maintaining the enclosure interior substantially free of oxygen by adding nitrogen from a nitrogen source.

15. The process of claim 2 further comprising the step of adding additional heat to the molten metal as the molten metal is transferred from the cooling bath to the heating bath.

* * * * *